(12) United States Patent
Smoke et al.

(10) Patent No.: US 10,260,355 B2
(45) Date of Patent: Apr. 16, 2019

(54) DIVERGING-CONVERGING COOLING PASSAGE FOR A TURBINE BLADE

(71) Applicant: HONEYWELL INTERNATIONAL INC., Morris Plains, NJ (US)

(72) Inventors: Jason Smoke, Phoenix, AZ (US);
David K Jan, Fountain Hills, AZ (US);
Amandine Miner, Tempe, AZ (US);
Deanna Pinar Chase, Tempe, AZ (US);
Michael Kahrs, Phoenix, AZ (US);
Lorenzo Crosatti, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 433 days.

(21) Appl. No.: 15/062,952

(22) Filed: Mar. 7, 2016

(65) Prior Publication Data

US 2017/0254209 A1    Sep. 7, 2017

(51) Int. Cl.
*F01D 5/18* (2006.01)
*F01D 5/04* (2006.01)
*F01D 1/08* (2006.01)
*F01D 5/30* (2006.01)

(52) U.S. Cl.
CPC .......... *F01D 5/187* (2013.01); *F01D 5/046* (2013.01); *F01D 1/08* (2013.01); *F01D 5/045* (2013.01); *F01D 5/3061* (2013.01); *F05D 2220/32* (2013.01); *F05D 2260/202* (2013.01); *Y02T 50/673* (2013.01); *Y02T 50/676* (2013.01)

(58) Field of Classification Search
CPC . F01D 5/187; F01D 5/18; F01D 5/046; F01D 5/04; F01D 5/043; F05D 2220/32; F05D 2260/202; F05D 2260/20; F05D 2260/221; F05D 2260/2212; F05D 2260/2214; F05D 2260/22141
USPC ...................................................... 416/97 R
See application file for complete search history.

(56) References Cited

U.S. PATENT DOCUMENTS

| 4,500,258 A | * | 2/1985 | Dodd ................. F01D 5/187 |
| | | | 416/96 R |
| 4,604,031 A | | 8/1986 | Moss et al. |
| 4,604,780 A | | 8/1986 | Metcalfe |

(Continued)

FOREIGN PATENT DOCUMENTS

| EP | 1016773 A2 | 7/2007 |
| EP | 2803820 A2 | 11/2014 |

OTHER PUBLICATIONS

Extended EP Search Report for Application No. 17154282.2-1610 dated Jul. 6, 2017.

*Primary Examiner* — Carlos A Rivera
*Assistant Examiner* — Justin A Pruitt
(74) *Attorney, Agent, or Firm* — Lorenz & Kopf, LLP

(57) ABSTRACT

A turbine blade and a radial turbine having at least one blade is provided. The turbine blade includes a trailing edge and a leading edge opposite the trailing edge. The turbine blade also includes a cooling passage defined internally within the turbine blade. The cooling passage is in fluid communication with a source of cooling fluid via a single inlet to receive a cooling fluid. The cooling passage diverges at a first point downstream from the single inlet into at least two branches that extend along the at least one blade from the first point to a second point near a tip of the leading edge and the cooling passage converges at the second point.

20 Claims, 12 Drawing Sheets

(56) References Cited

U.S. PATENT DOCUMENTS

| | | | |
|---|---|---|---|
| 5,857,837 A | | 1/1999 | Zelesky et al. |
| 6,969,230 B2 | | 11/2005 | Shi et al. |
| 7,278,460 B2 | | 10/2007 | Grunstra et al. |
| 7,674,093 B2 | | 3/2010 | Lee et al. |
| 7,695,243 B2 | | 4/2010 | Lee et al. |
| 7,824,158 B2 | | 11/2010 | Bauer et al. |
| 7,866,370 B2 | | 1/2011 | Cunha |
| 8,496,443 B2 | | 7/2013 | Campbell et al. |
| 8,632,311 B2 | | 1/2014 | Klasing et al. |
| 9,181,807 B2 | | 11/2015 | Kuwabara |
| 2010/0290917 A1 | * | 11/2010 | Wilson, Jr. .............. F01D 5/147 416/226 |
| 2013/0272882 A1 | | 10/2013 | Mittendorf et al. |
| 2013/0280036 A1 | * | 10/2013 | Jan .......................... F01D 5/026 415/66 |
| 2014/0178207 A1 | | 6/2014 | He et al. |
| 2015/0053365 A1 | | 2/2015 | Mueller et al. |

\* cited by examiner

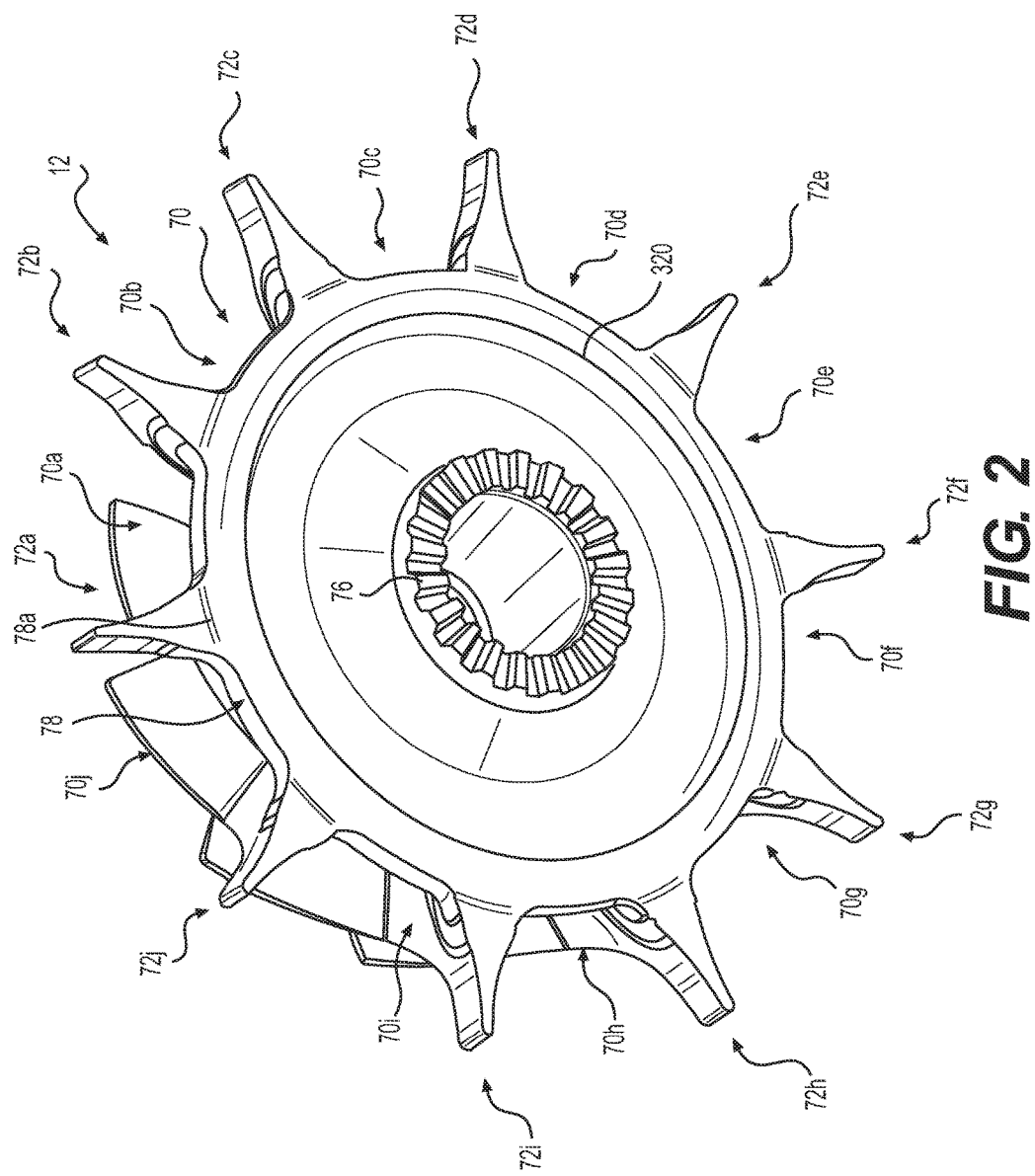

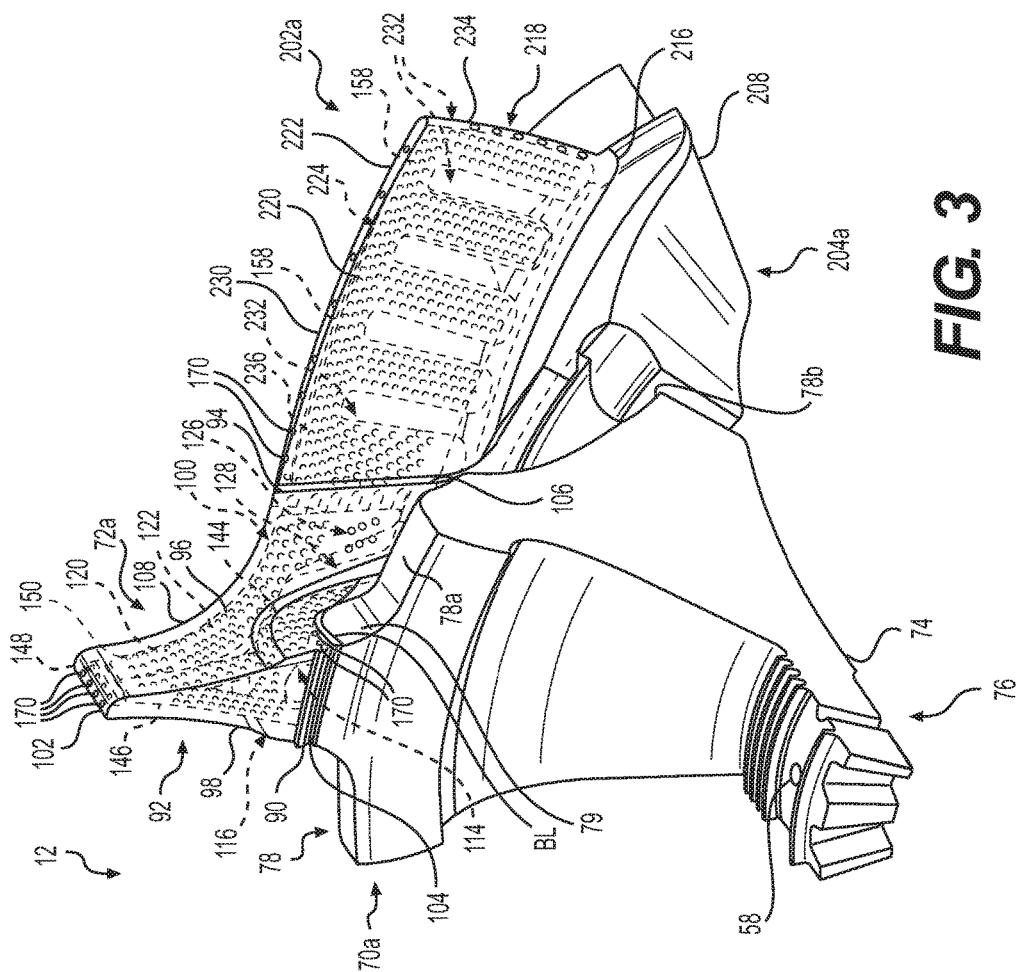

DIVERGING-CONVERGING COOLING PASSAGE FOR A TURBINE BLADE

TECHNICAL FIELD

The present disclosure generally relates to gas turbine engines, and more particularly relates to a radial turbine for use within a gas turbine engine that has one or more turbine blades with an internal diverging-converging cooling passage.

BACKGROUND

Gas turbine engines may be employed to power various devices. For example, a gas turbine engine may be employed to power a mobile platform, such as an aircraft. In certain examples, gas turbine engines include a radial turbine positioned immediately downstream of a combustion section of the gas turbine engine. Generally, higher radial turbine inlet temperature and higher radial turbine engine speed are required to improve gas turbine engine efficiency. Increased speeds and higher temperatures, however, may increase a risk of oxidation of a blade of the radial turbine and may increase mechanical stress resulting from centrifugal forces acting on the radial turbine blade.

Accordingly, it is desirable to provide improved cooling for a radial turbine blade using a diverging-converging cooling passage, which cools the radial turbine blade while withstanding the centrifugal forces acting on the radial turbine blade. Furthermore, other desirable features and characteristics of the present invention will become apparent from the subsequent detailed description and the appended claims, taken in conjunction with the accompanying drawings and the foregoing technical field and background.

SUMMARY

In various embodiments, provided is a turbine blade. The turbine blade includes a trailing edge and a leading edge opposite the trailing edge. The turbine blade also includes a cooling passage defined internally within the turbine blade. The cooling passage is in fluid communication with a source of cooling fluid via a single inlet to receive a cooling fluid. The cooling passage diverges at a first point downstream from the single inlet into at least two branches that extend along the at least one blade from the first point to a second point near a tip of the leading edge and the cooling passage converges at the second point.

Also provided is a radial turbine. The radial turbine includes a hub and at least one blade coupled to the hub. The at least one blade has a coupling surface that couples the at least one blade to the hub and a leading edge having a tip. The at least one blade defines an internal cooling passage, and the internal cooling passage is in fluid communication with a source of cooling fluid via a single inlet to receive a cooling fluid. The internal cooling passage diverges downstream from the single inlet into at least two branches that extend along opposite sides of the coupling surface to near the tip of the leading edge and the internal cooling passage converges at the tip.

DESCRIPTION OF THE DRAWINGS

The exemplary embodiments will hereinafter be described in conjunction with the following drawing figures, wherein like numerals denote like elements, and wherein:

FIG. 2 is a forward perspective view of the radial turbine of FIG. 1A;

FIG. 3 is a perspective view of a section of the radial turbine of FIG. 1A;

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of turbine blade that would benefit from a diverging-converging cooling passage configuration, and that the radial turbine blade described herein for use with a gas turbine engine is merely one exemplary embodiment according to the present disclosure. Moreover, while the radial turbine blade is described herein as being used with a radial turbine of a gas turbine engine onboard a mobile platform or vehicle, such as a bus, motorcycle, train, motor vehicle, marine vessel, aircraft, rotorcraft and the like, the various teachings of the present disclosure can be used with a gas turbine engine or with a radial turbine associated with a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

Figure 1:
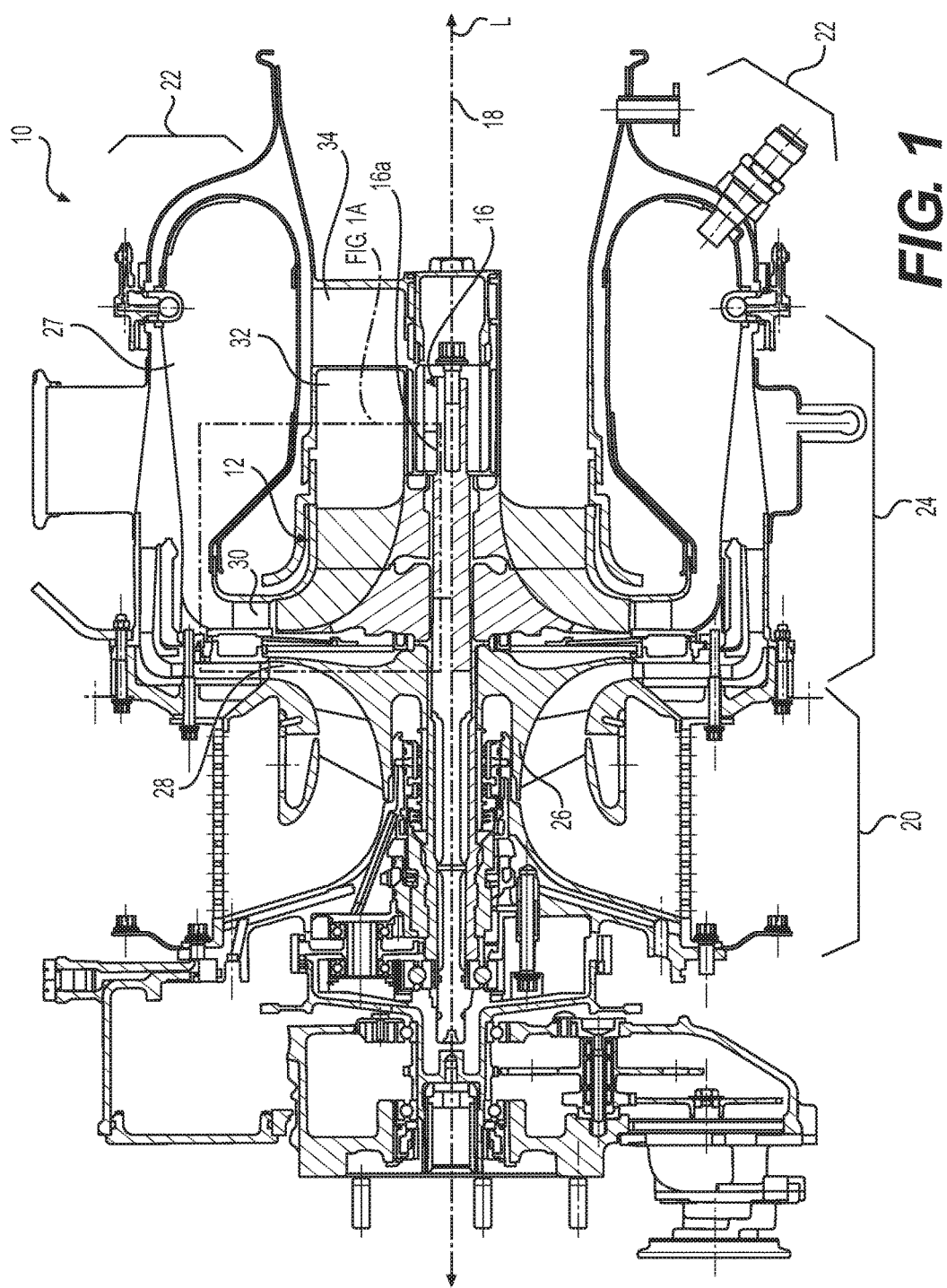
FIG. 1 is a schematic cross-sectional illustration of a gas turbine engine including a radial turbine having a turbine blade, with the cross-sectional illustration taken along a curvature of the turbine blade.

With reference to FIG. 1, a simplified cross-sectional view of an exemplary gas turbine engine 10 is shown. The gas turbine engine 10 includes a radial turbine 12. In this example, the radial turbine 12 comprises an axially-split radial turbine, however, it will be understood that the teachings of the present disclosure are applicable to a monolithic or one-piece radial turbine. Moreover, while the radial turbine 12 will be described herein as comprising a dual alloy axially-split radial turbine, the radial turbine 12 may comprise a single alloy, which may be cast or machined. In addition, while the radial turbine 12 is illustrated herein as being used with the gas turbine engine 10, which can be included with an auxiliary power unit, the radial turbine 12 can be employed with various types of engines, including, but not limited to, turbofan, turboprop, turboshaft, and turbojet engines, whether deployed onboard an aircraft, watercraft, or ground vehicle (e.g., a tank), included within industrial power generators, or utilized within another platform or application. In this example, the gas turbine engine 10 is employed within an aircraft 8.

In the example shown in FIG. 1, the gas turbine engine 10 is illustrated as a single spool engine including a high pressure (HP) shaft 16. It should be noted that the use of a single spool engine is merely exemplary, as any number of spools can be employed. The HP shaft 16 extends along an axis of rotation 18. The axis of rotation 18 comprises a longitudinal axis L of the gas turbine engine 10. In this example, the gas turbine engine 10 includes a compressor section 20, a combustion section 22, and a turbine section 24. In certain examples, the compressor section 20 includes a HP compressor 26, which is mounted to an upstream or forward end of the HP shaft 16. The HP compressor 26 is in communication with a compressor section duct 28 to receive airflow from an intake section of the gas turbine engine 10. The HP compressor 26 pressurizes the air in the compressor section duct 28, and the compressor section duct 28 is in communication with the combustion section 22 to deliver the compressed air to a combustion chamber (not shown) of the combustion section 22.

The combustion section 22 includes the combustion chamber 27. The compressed air from the compressor section 20 is mixed with fuel and ignited to produce combustive gases in the combustion chamber 27. The combustive gases are directed from the combustion chamber 27 to the turbine section 24. The turbine section 24 includes the radial turbine 12, which is mounted to an opposing, aft end 16a of the HP shaft 16 as the HP turbine for the gas turbine engine 10. The turbine section 24 also includes a turbine duct section 30, which is in fluid communication with the combustion section 22 to receive combustive gases from the combustion chamber 27. A second turbine duct section 32 is positioned downstream from the radial turbine 12, and is in fluid communication with a turbine nozzle ring 34. The second turbine duct section 32 directs the combustive gas flow from the radial turbine 12 to the turbine nozzle ring 34.

Figure 1A:
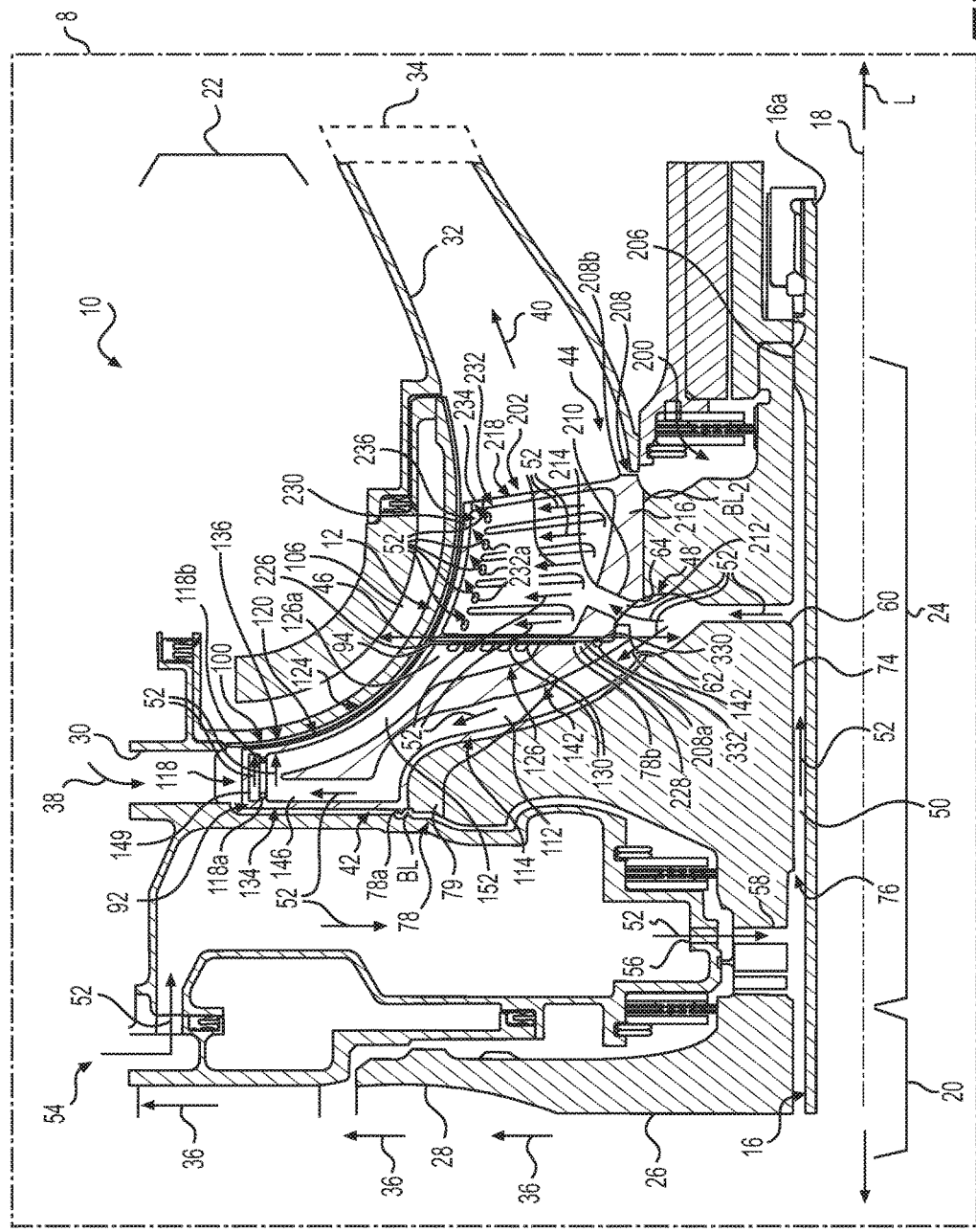
FIG. 1A is a detail cross-sectional illustration of a portion of the gas turbine engine of FIG. 1, which includes the radial turbine having the turbine blade, and the turbine blade includes an exemplary diverging-converging cooling passage, with the cross-sectional illustration taken along the curvature of the turbine blade.

During engine operation, airflow is received from the intake section included within the gas turbine engine 10 and supplied to the compressor section 20. As indicated in FIG. 1A by arrows 36, the compressor section duct 28 guides the pressurized airflow through the HP compressor 26, which further compresses the airflow prior to discharge into the combustion section 22. The compressed airflow is directed into a combustion chamber 27 (FIG. 1) included within combustion section 22, mixed with fuel, and ignited to produce combustive gasses. As indicated in FIG. 1A by arrows 38, the combustive gasses expand rapidly, exit the combustion section 22 through a turbine scroll (not shown), and are directed through the turbine duct section 30 to the radial turbine 12.

The combustive gases 38 drive rotation of the radial turbine 12, which drives further rotation of the HP shaft 16 and the HP compressor 26. After flowing through the radial turbine 12, the second turbine duct section 32 directs the combustive gas flow (indicated in FIG. 1A by arrow 40) into the turbine nozzle ring 34. Turbine nozzle ring 34 accelerates the combustive gas flow 40. The rotation of the HP shaft 16 provides power output, which may be utilized in a variety of different manners, depending upon whether the gas turbine engine 10 assumes the form of a turbofan, turboprop, turboshaft, turbojet engine, or an auxiliary power unit, to list but a few examples. The combustive gas flow is then mixed with cooler bypass flow and exhausted from the gas turbine engine 10. For example, in the case of turbofan and turbojet engine, the combustive gas flow may be exhausted through a propulsion nozzle to provide forward thrust.

In this example, the radial turbine 12 is axially-split or fabricated from at least two discrete portions, which are separated along a plane orthogonal to the axis of rotation 18 and which are assembled to produce a completed turbine. It should be noted, however, that the radial turbine 12 may comprise a one-piece or monolithic radial turbine, if desired. With reference to FIG. 1A, in this example, the radial turbine 12 includes two halves: a first, forward turbine rotor 42, and a second, aft turbine rotor 44. The aft face of forward turbine rotor 42 and the forward face of aft turbine rotor 44 abut along a generally annular interface, which resides within the plane generally orthogonal to the axis of rotation 18 and which is generally referred to as "split line" 46. The forward turbine rotor 42 and the aft turbine rotor 44 are generally assembled so as to rotate in unison, and may be coupled together via any suitable technique, such as a tie-shaft, mechanical fasteners, etc. It should be noted, however, that the forward turbine rotor 42 and the aft turbine rotor 44 may also be bonded together, via welding, for example, if desired. Generally, the forward turbine rotor 42 and the aft turbine rotor 44 are coupled together so as to define a cooling air plenum 48. It should be noted that while the cooling air plenum 48 is generally illustrated herein as being substantially continuous about a circumference of the radial turbine 12, the cooling air plenum 48 may comprise a plurality of distinct plenums spaced apart about the circumference of the radial turbine 12, if desired.

The cooling air plenum 48 receives cooling fluid or air from a source upstream from the radial turbine 12 and directs the cooling air into the forward turbine rotor 42 and the aft turbine rotor 44. In one example, the cooling air plenum 48 is in fluid communication with a duct 50, which provides cooling air, as indicated in FIG. 1A by arrows 52, bled from a section of the gas turbine engine 10 upstream of the combustion section 22. In this example, a portion of the airflow flowing within compressor section duct 28 is diverted into outlet (not shown) of a combustion bypass conduit 54 to provide the cooling air 52. The cooling air 52 flowing from the combustion bypass conduit 54 is directed radially inward toward the engine centerline via an outlet 56 and a passage 58 defined through a portion of the forward turbine rotor 42. From the passage 58, the cooling air 52 flows axially along the HP shaft 16 and ultimately flows into an inlet 60 of the cooling air plenum 48. In this example, the cooling air plenum 48 includes a first inlet 62 and a second inlet 64. The first inlet 62 is in fluid communication with the forward turbine rotor 42, and the second inlet 64 is in fluid communication with the aft turbine rotor 44. The first inlet 62 and the second inlet 64 provide the forward turbine rotor 42 and the aft turbine rotor 44 with cooling air to internally cool the forward turbine rotor 42 and the aft turbine rotor 44.

With reference to FIG. 2, the forward turbine rotor 42 includes a first hub portion 70 and a first plurality of blades 72 (i.e. inducer blades). The first hub portion 70 is substantially annular about the axis of rotation 18. In one example, the first hub portion 70 is substantially one-piece or monolithic, and defines a number of sectors 70a-j that corresponds to a number of blades 72a-j, such that each sector 70a-j of the first hub portion 70 corresponds to a respective one of the blades 72a-j. As each of the sectors 70a-j and each of the blades 72a-j are substantially similar, the following description of the sector 70a and the blade 72a will be understood to be applicable to the remaining sector 70b-j and blades 72b-j. It will be understood that while the first hub portion 70 is described herein as comprising the plurality of sectors 70a-j, the first hub portion 70 generally comprises a one-piece or monolithic component, and the use of sectors 70a-j is merely for ease of the description.

With reference to FIG. 1A, the sector 70a defines a bore 74, which is sized to enable the HP shaft 16 to pass therethrough. The sector 70a also includes a collar 76 and an outer peripheral surface 78 and an inlet cooling air passage 80. The collar 76 defines the passage 58, and couples the radial turbine 12 for rotation with the HP compressor 26 of the compressor section 20. The collar 76 is generally positioned near the axial centerline of the radial turbine 12, or adjacent to the axis of rotation 18. The outer peripheral surface 78 couples the blade 72a to the first hub portion 70. As illustrated in FIG. 1A, the outer peripheral surface 78 slopes radially inward toward the axis of rotation 18 from a first end 78a to a second end 78b. The outer peripheral surface 78 also includes a saddle 79 at the first end 78a. The saddle 79 is raised relative to a remainder of the outer peripheral surface 78 at the first end 78a and forms a coupling surface for the blade 72a.

Figure 4:
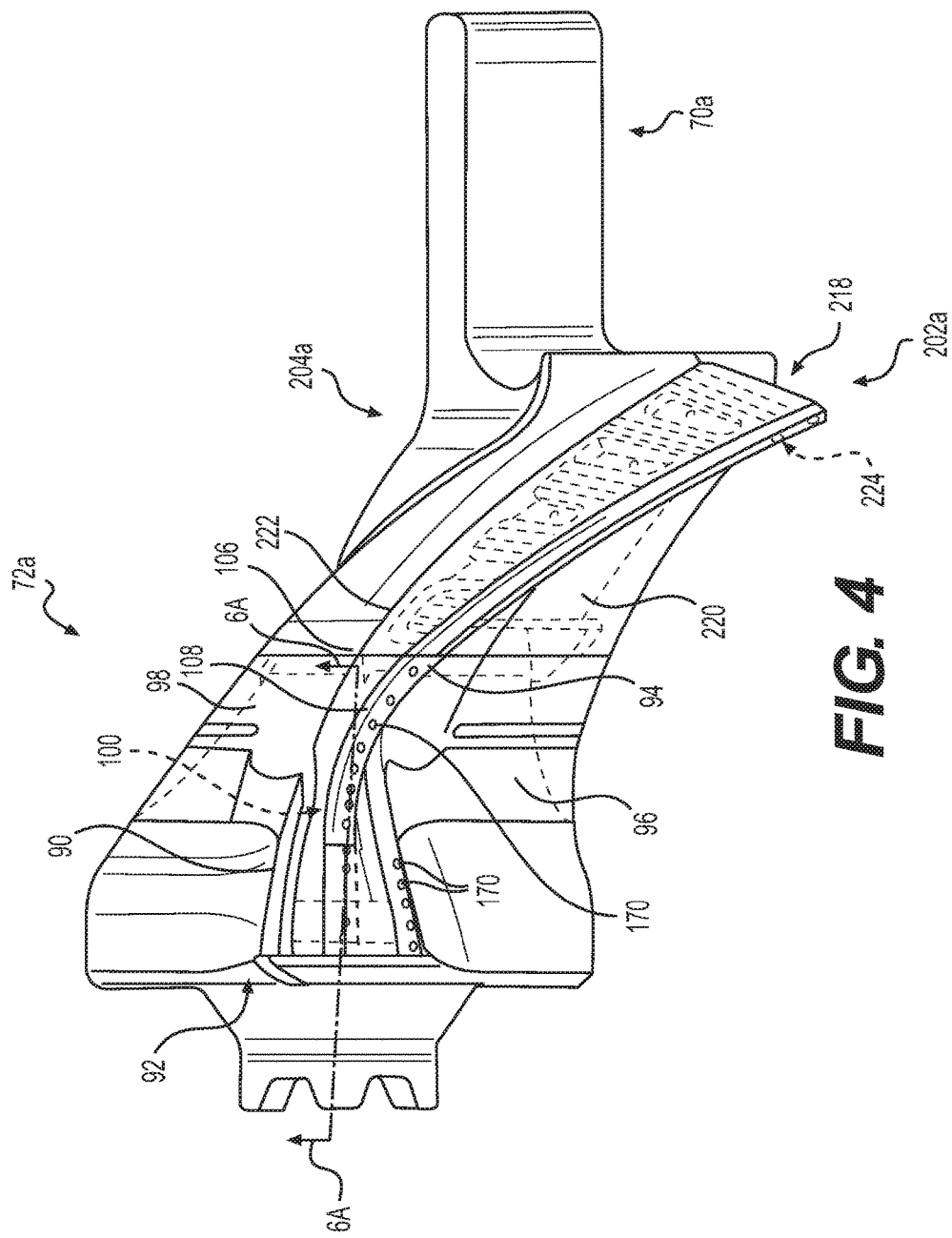
FIG. 4 is a top view of the section of the radial turbine of FIG. 3.

As will be discussed further herein, the blade 72a is coupled to the outer peripheral surface 78 of the sector 70a. With reference to FIGS. 3 and 4, the blade 72a has a coupling surface 90, a leading edge 92, a trailing edge 94, a first or pressure side 96, a second or suction side 98 and a diverging-converging cooling passage 100 defined internally within the blade 72a. The coupling surface 90 is formed along a bottom surface of the blade 72a, or the surface of the blade 72a in contact with the outer peripheral surface 78 of the sector 70a. In one example, the coupling surface 90 couples the blade 72a to the sector 70a. For example, with reference to FIG. 5, the coupling surface 90 may be metallurgically bonded to the outer peripheral surface 78 of the first hub portion 70 via diffusion bonding along a bond line BL. It should be understood that various other techniques may be employed to couple the blade 72a to the sector 70a of the first hub portion 70. The leading edge 92 of the blade 72a includes a tip or tip portion 102 that tapers to a base portion 104. The base portion 104 is adjacent to the outer peripheral surface 78 when the blade 72a is coupled to the outer peripheral surface 78 via the coupling surface 90. The base portion 104 is generally wider than the tip portion 102 to provide for a wider coupling surface 90 to aid in withstanding the centrifugal forces acting on the bond line BL.

With reference to FIG. 3, the trailing edge 94 comprises the distalmost portion of the blade 72a. The trailing edge 94 cooperates with a respective leading edge 106 of the aft turbine rotor 44 to form a substantially continuous airflow guidance surface. In one example, the trailing edge 94 is interlocked with the leading edge 106; however, the trailing edge 94 may be positioned adjacent to the leading edge 106 to form a substantially continuous airflow guidance surface through the coupling of the forward turbine rotor 42 to the aft turbine rotor 44. The pressure side 96 is substantially opposite the suction side 98. Each of the pressure side 96 and the suction side 98 extend along the blade 72a from the leading edge 92 to the trailing edge 94.

Figure 6:
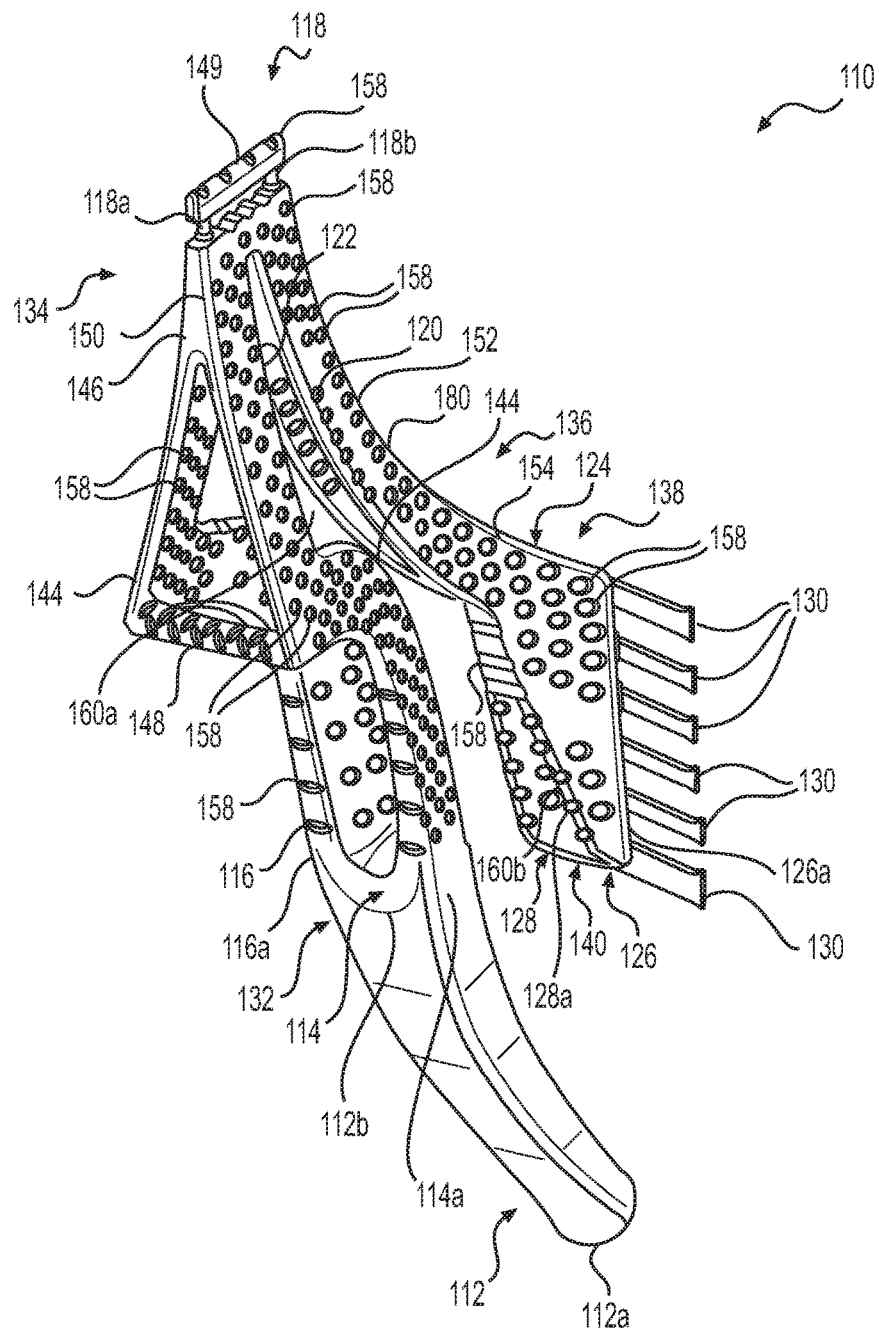
FIG. 6 is a perspective view of a core for use in forming the diverging-converging cooling passage of the radial turbine of FIG. 1A.
Figure 6A:
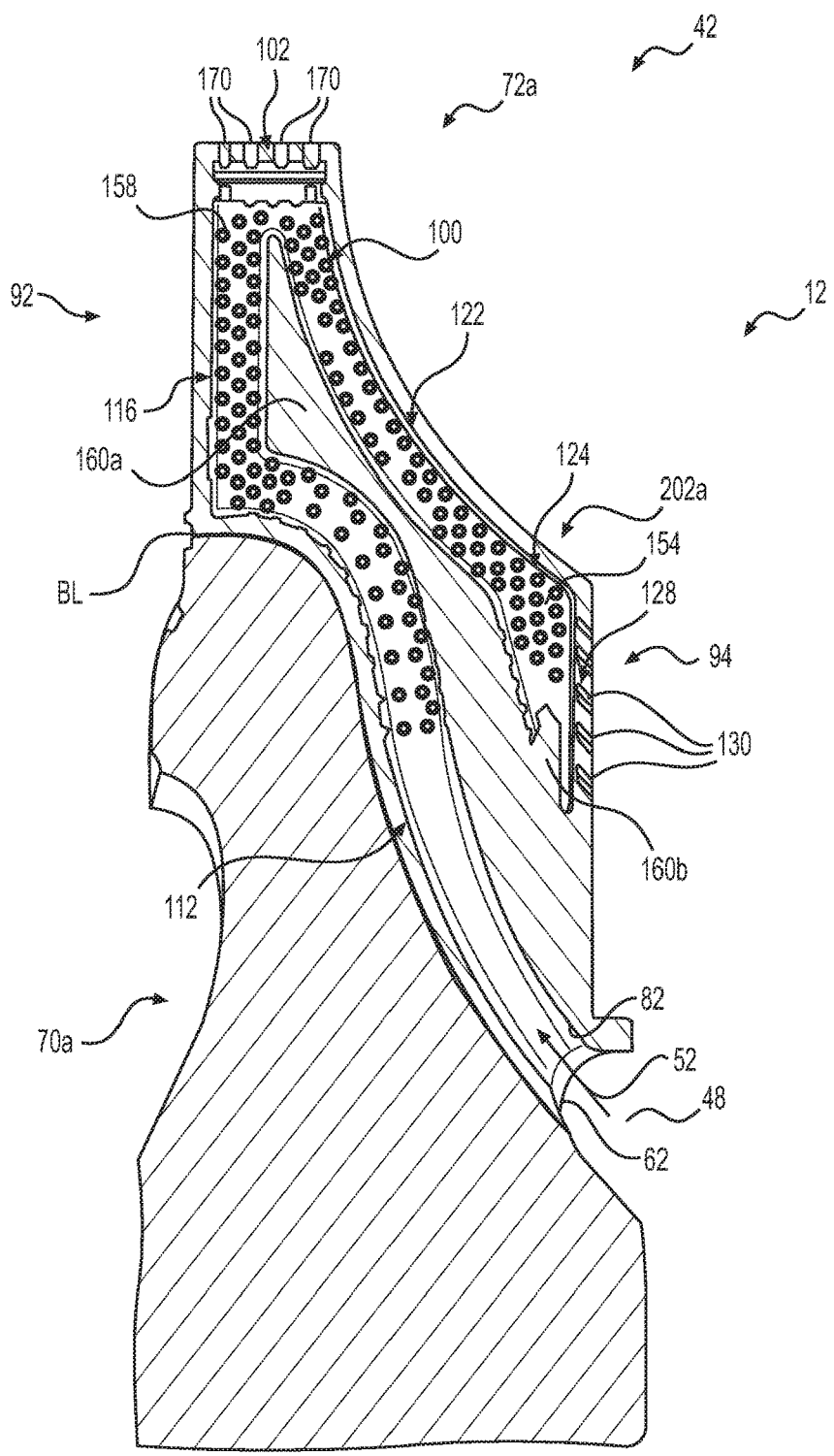
FIG. 6A is a cross-sectional view of a forward turbine rotor of the radial turbine of FIG. 4, taken along line 6A-6A of FIG. 4.

With reference to FIG. 3, the diverging-converging cooling passage 100 is defined through the blade 72a to extend from the coupling surface 90 to the leading edge 92 and along a surface 108 of the blade 72a opposite the coupling surface 90 to the trailing edge 94. With reference to FIG. 6, an exemplary core 110 for forming the diverging-converging cooling passage 100 internally within the blade 72a is shown. It should be understood that the core 110 comprises an exemplary structure used to form the diverging-converging cooling passage 100 within the blade 72a, and that the core 110 generally forms no part of the finished blade 72a, as illustrated by the cross-section of a portion of the forward turbine rotor 42 in FIG. 6A. In this regard, as illustrated in FIG. 6A, the diverging-converging cooling passage 100 is formed or defined internally and wholly within the blade 72a to extend along the bond line BL, along the leading edge 92, along the surface 108 and to exit the blade 72a at the trailing edge 94.

With continued reference to FIG. 6, the diverging-converging cooling passage 100 includes an inlet flow passage 112 that diverges into a first branch 114 and a second branch 116, converges at a tip section 118, diverges from the tip section 118 to a third branch 120 and a fourth branch 122, converges at a first trailing edge section 124 and diverges into a fifth branch 126 and a sixth branch 128 prior to reaching a plurality of outlets 130. Stated another way, the diverging-converging cooling passage 100 includes the inlet flow passage 112 that leads to a first diverging section 132, a first converging section 134, a second diverging section 136, a second converging section 138 and a third diverging section 140 adjacent to the plurality of outlets 130.

With continued reference to FIG. 6 and additional reference to FIG. 1A, the inlet flow passage 112 is in fluid communication with the first inlet 62 of the cooling air plenum 48 via a bore 142 to receive the cooling air 52 from the cooling air plenum 48 (FIG. 1A). Thus, the inlet flow passage 112 comprises the sole inlet flow passage for cooling air into the blade 72a. The inlet flow passage 112 includes an inlet 112a in fluid communication with the first inlet 62, and the inlet flow passage 112 diverges at an outlet 112b. In this example, the inlet flow passage 112 diverges into two branches, the first branch 114 and the second branch 116, at the outlet 112b, however, it will be understood that the inlet flow passage 112 may diverge into additional branches, if desired. Generally, the inlet flow passage 112 diverges into the two branches, the first branch 114 and the second branch 116, to guide or direct cooling air flow along a respective one of the pressure side 94 and the suction side 96 of the blade 72a, as shown in FIG. 3. As best shown in FIG. 1A, the first branch 114 and the second branch 116 are defined to guide or direct cooling air from the inlet flow passage 112 along the coupling surface 90 and the leading edge 92 adjacent to the respective one of the pressure side 94 and the suction side 96. Thus, the first branch 114 and the second branch 116 serve to guide or direct the cooling air along the coupling surface 90 and the leading edge 92, which improves the cooling of the blade 72a and thereby assists in reducing the risk of oxidation of the blade 72a.

Figure 5:
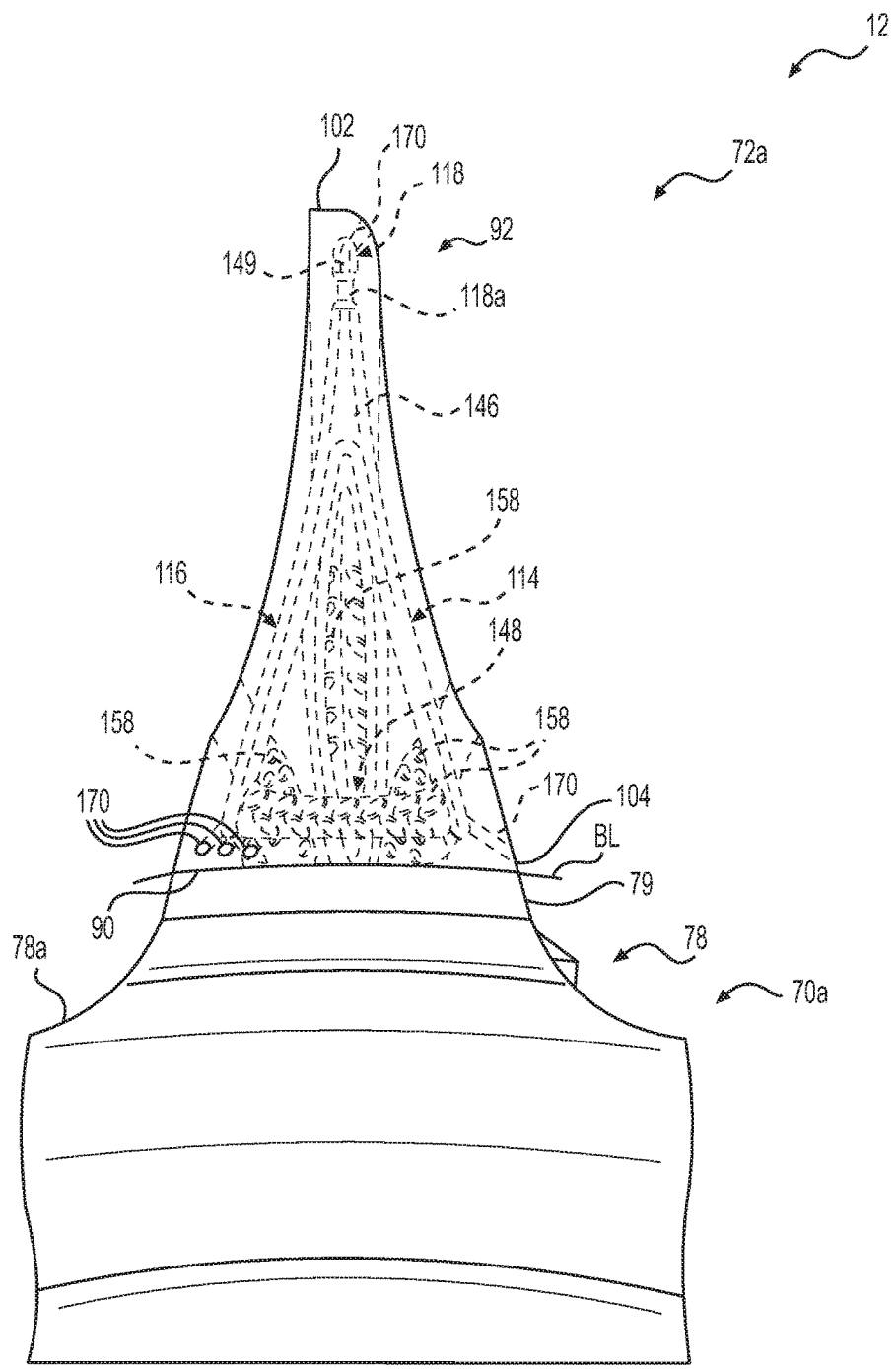
FIG. 5 is an end view of the section of the radial turbine of FIG. 3.

The first branch 114 and the second branch 116 may each include a curved portion 144, which is shaped to correspond with a contour of the bond line BL. It should be noted that the shape of the curved portion 144 may vary based on the shape of the outer peripheral surface 78, and thus, the curvature of the curved portion 144 illustrated herein is merely an example. The first branch 114 and the second branch 116 each include an inlet 114a, 116a in fluid communication with the outlet 112b. The first branch 114 and the second branch 116 converge at a common outlet 146 near the tip portion 102 of the leading edge 92. Between the curved portion 144 and the common outlet 146, is a cross branch 148. The cross branch 148 fluidly interconnects the first branch 114 and the second branch 116 at the leading edge 92 to provide cooling air flow along the bond line BL at the leading edge 92, as illustrated in FIG. 5. The additional cooling air flow provided by the cross branch 148 assists in maintaining the metallurgical bond between the blade 72a and the sector 70a during extreme operating temperatures.

With reference to FIGS. 1A and 6, the tip section 118 is in fluid communication with the common outlet 146 to receive the cooling air 52. The tip section 118 includes a first inlet flow passage 118a in fluid communication with the common outlet 146 near or at the first converging section 134, and a second inlet flow passage 118b in fluid communication with the common outlet 146 downstream from the inlet flow passage 118a near the second diverging section 136. In one example, each of the first inlet flow passage 118a and the second inlet flow passage 118b are in fluid communication with one or more film cooling holes 170. As will be discussed further herein, the film cooling holes 170 are defined through the blade 72a so as to be in fluid communication with various portions of the diverging-converging cooling passage 100 to provide for film cooling along an exterior surface of the blade 72a. A tip flow passage 149 extends along the tip portion 102 of the leading edge 92 to provide cooling air flow along the surface 108 at the tip portion 102.

The common outlet 146 is in fluid communication with a second common inlet 150 of the third branch 120 and the fourth branch 122. Thus, downstream from the common outlet 146, near the tip portion 102, the diverging-converging cooling passage 100 diverges into the third branch 120 and the fourth branch 122. In this example, the diverging-converging cooling passage 100 diverges into two branches, the third branch 120 and the fourth branch 122, at the second common inlet 150; however, it will be understood that the diverging-converging cooling passage 100 may diverge into additional branches, if desired. Generally, the diverging-converging cooling passage 100 diverges into the two branches, the third branch 120 and the fourth branch 122, to guide or direct cooling air flow along a respective one of the pressure side 94 and the suction side 96 of the blade 72a, as shown in FIG. 3. As best shown in FIG. 1A, the third branch 120 and the fourth branch 122 are defined to guide or direct cooling air from the second common inlet 150 along the respective one of the pressure side 94 and the suction side 96 adjacent to the surface 108 of the blade 72a. Thus, the third branch 120 and the fourth branch 122 serve to guide or direct the cooling air adjacent to the surface 108 of the blade 72a in contact with the combustive gases, thereby improving the cooling of the blade 72a.

With reference to FIG. 6, the third branch 120 and the fourth branch 122 may each include a curved portion 152, which is shaped to correspond with a shape of the blade 72a. It should be noted that the shape of the curved portion 152 may vary based on the shape of the blade 72a, and thus, the curvature of the curved portion 152 illustrated herein is merely an example. The third branch 120 and the fourth branch 122 converge at a third common outlet 154. The cooling air 52 from the second common inlet 150 is directed through a respective one of the third branch 120 and the fourth branch 122 to the third common outlet 154 at the second converging section 138.

The third common outlet 154 is in fluid communication with the fifth branch 126 and the sixth branch 128. Thus, from the convergence at the third common outlet 154, the diverging-converging cooling passage 100 diverges into the fifth branch 126 and the sixth branch 128. In this example, the diverging-converging cooling passage 100 diverges into two branches, the fifth branch 126 and the sixth branch 128, at the third common outlet 154, however, it will be understood that the diverging-converging cooling passage 100 may diverge into additional branches, if desired. Generally, the diverging-converging cooling passage 100 diverges into the two branches, the fifth branch 126 and the sixth branch 128, to guide or direct cooling air flow along a respective one of the pressure side 94 and the suction side 96 of the blade 72a at the trailing edge 94, as shown in FIG. 3.

With reference to FIG. 1A, the fifth branch 126 and the sixth branch 128 each extend in a direction substantially perpendicular to the axis of rotation 18 to provide cooling air flow along the trailing edge 94 of the blade 72a. Each of the fifth branch 126 and the sixth branch 128 include an outlet 126a, 128a (FIG. 6), which is in fluid communication with the plurality of outlets 130. The plurality of outlets 130 each direct the cooling air 52 toward the aft turbine rotor 44.

With reference to FIG. 6, one or more of the inlet flow passage 112, the first branch 114, the second branch 116, the cross branch 148, the inlet flow passage 118a, the outlet flow passage 118b, the tip flow passage 149, the third branch 120, the fourth branch 122, the fifth branch 126 and the sixth branch 128 include at least one heat transfer augmentation feature, for example, at least one turbulator 158. In this example, one or more of the inlet flow passage 112, the first branch 114, the second branch 116, the cross branch 148, the inlet flow passage 118a, the outlet flow passage 118b, the tip flow passage 149, the third branch 120, the fourth branch 122, the fifth branch 126 and the sixth branch 128 include a plurality of turbulators 158. The turbulators 158 comprise protrusions or projections into the respective flow passages that turn the cooling air flow from a laminar flow to a turbulent flow, or stated another way; impart turbulence into the cooling air flow, thereby improving heat transfer between the blade 72a and the cooling air. Thus, the turbulators 158 comprise a plurality of heat transfer augmentation features that increase the cooling effectiveness of the cooling fluid. Generally, the turbulators 158 may have any desired shape and size to impart turbulence into the cooling air flow through the diverging-converging cooling passage 100, and thereby improve the cooling effect along the blade 72a.

In addition, with reference to FIG. 6, the core 110 illustrated in FIG. 6 includes one or more die locked pockets 160. In this example, a die locked pocket 160a is defined between the first branch 114, the second branch 116, the third branch 120 and the fourth branch 122, and a die locked pocket 160b is defined between the fifth branch 126 and the sixth branch 128. The die locked pockets 160a, 160b result in solid metal (160c, 160d in FIG. 6A) when the blade 72a is formed and aid in keeping the cooling air close to an exterior surface of the blade 72a. Moreover, the die locked pockets 160a, 160b reduces the cross-section of each of the first branch 114, the second branch 116, the third branch 120, the fourth branch 122, the fifth branch 126 and the sixth branch 128, which results in more turbulent flow of the cooling air 52 through the diverging-converging cooling passage 100, which thereby improves the cooling efficiency of the cooling air 52.

In this example, the blade 72a includes the one or more film cooling holes 170. The film cooling holes 170 are defined through a surface of the blade 72a and extend to enable fluid from the diverging-converging cooling passage 100 to flow through the film cooling hole 170 and exit along an exterior surface of the blade 72a. In one example, with reference to FIG. 3, the film cooling holes 170 are defined along the first branch 114 and the second branch 116 near the bond line BL, along the tip portion 102 and along the surface 230 of the blade 202a. As shown in FIG. 5, the film cooling holes 170 are in fluid communication with the diverging-converging cooling passage 100 to direct the airflow from the diverging-converging cooling passage 100 to the exterior of the blade 72a, and with reference back to FIG. 3, the film cooling holes are also in fluid communication with the columns 232 to direct the airflow from the columns 232 to the exterior of the blade 202a.

Figure 7:
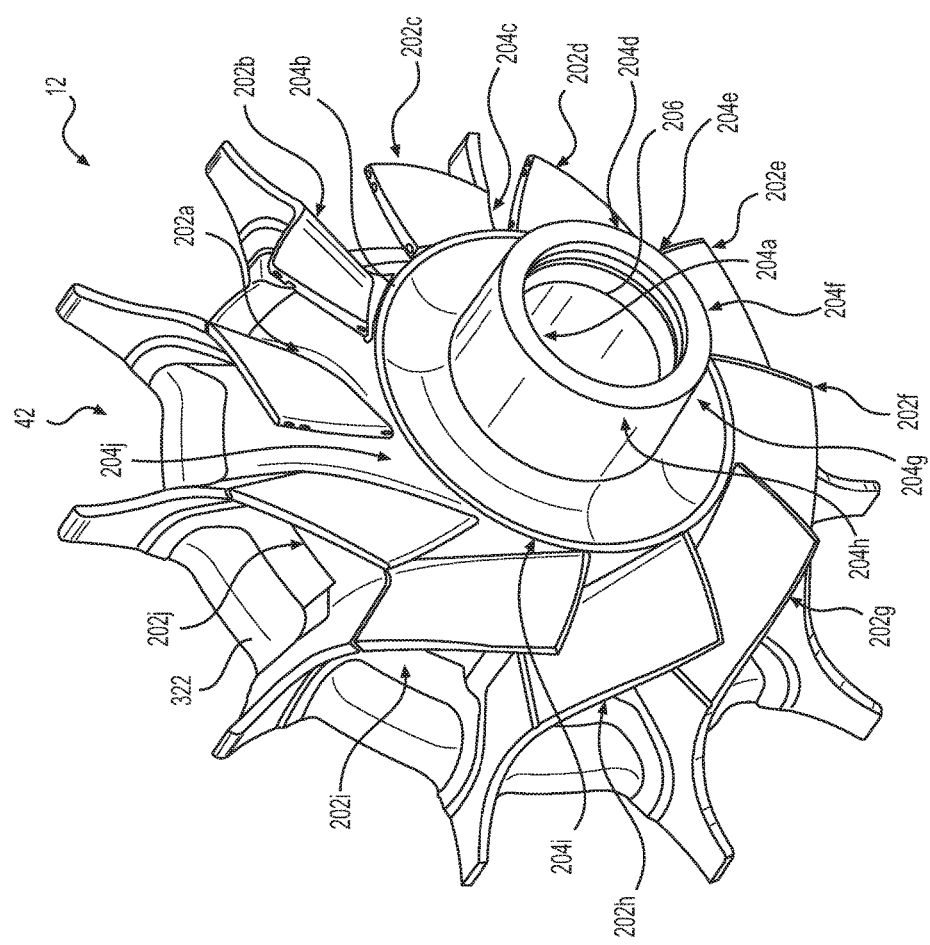
FIG. 7 is an aft perspective view of the radial turbine of FIG. 1A.

With reference to FIG. 7, the aft turbine rotor 44 is coupled to rotate with the forward turbine rotor 42. The aft turbine rotor 44 includes a second hub portion 200 and a second plurality of blades 202 (i.e. exducer blades). The second hub portion 200 is substantially annular about the axis of rotation 18. In one example, the second hub portion 200 is substantially one-piece or monolithic, and defines a number of slices or sectors 204a-j that corresponds to a number of blades 202a-j, such that each sector 204a-j of the second hub portion 200 corresponds to a respective one of the blades 202a-j. The sectors 204a-j cooperate to define a bore 206, which couples the HP shaft 16 to the aft turbine rotor 44, and thus, the radial turbine 12 (FIG. 1A). As each of the sectors 204a-j and each of the blades 202a-j are substantially similar, the following description of the sector 204a and the blades 202a will be understood to be applicable to the remaining sectors 204b-j and blades 202b-j. It will be understood that while the second hub portion 200 is described herein as comprising the plurality of sectors 204a-j, the second hub portion 200 generally comprises a one-piece or monolithic component, and the use of sectors 204a-j is merely for ease of the description.

With reference to FIG. 1A, the sector 204a includes an outer peripheral surface 208 and an inlet cooling air passage 210. The outer peripheral surface 208 couples the blade 202a to the second hub portion 200. As illustrated in FIG. 1A, the outer peripheral surface 208 slopes radially inward toward the axis of rotation 18 from a first end 208a to a second end 208b. The inlet cooling air passage 210 is defined near the first end 208a of the outer peripheral surface 208. The inlet cooling air passage 210 includes an inlet 212 in fluid communication with the second inlet 64 of the cooling air plenum 48 and an outlet 214 in fluid communication with the blade 202a. The inlet cooling air passage 210 directs the cooling air 52 from the cooling air plenum 48 into the respective blade 202a.

As will be discussed further herein, the blade 202a is coupled to the outer peripheral surface 208 of the sector 204a. With reference to FIGS. 3 and 4, the blade 202a has a coupling surface 216, the leading edge 106, a trailing edge 218, a first or pressure side 220, a second or suction side 222 and a cooling passage 224. The coupling surface 216 is formed along a bottom surface of the blade 202a, or the surface of the blade 202a in contact with the outer peripheral surface 208 of the sector 204a. In one example, the coupling surface 216 couples the blade 202a to the sector 204a. For example, the coupling surface 216 may be metallurgically bonded to the outer peripheral surface 208 of the second hub portion 200 via diffusion bonding along a bond line BL2 (FIG. 1A). It should be understood that various other techniques may be employed to couple the blade 202a to the sector 204a of the second hub portion 200. As best shown in FIG. 1A, the leading edge 106 of the blade 202a includes a tip portion 226 that tapers to a base portion 228. The base portion 228 is adjacent to the outer peripheral surface 208 when the blade 202a is coupled to the outer peripheral surface 208 via the coupling surface 216. The base portion 228 is generally wider than the tip portion 226 to provide for a wider coupling surface 216 to aid in withstanding the centrifugal forces acting on the bond line BL2.

In one example, the leading edge 106 of the blade 202a is positioned adjacent to and may abut the trailing edge 94 of the blade 72a to form the substantially continuous airflow guidance surface. The trailing edge 218 comprises the distalmost portion of the blade 202a. With reference to FIG. 4, the pressure side 220 is substantially opposite the suction side 222. Each of the pressure side 220 and the suction side 222 extend along the blade 202a from the leading edge 106 to the trailing edge 218.

With reference to FIG. 1A, the cooling passage 224 is defined through the blade 202a to extend from the coupling surface 216 to a surface 230 opposite the coupling surface 216. In one example, the cooling passage 224 comprises a series of airflow columns 232 that extend between the coupling surface 216 and the surface 230, with each of the columns 232 in fluid communication with the inlet 212 to receive the cooling air 52 from the second inlet 64 of the cooling air plenum 48. The columns 232 each extend substantially transverse to the axis of rotation 18, and are defined within the blade 202a so as to be spaced apart along the blade 202a from the leading edge 106 to the trailing edge 218. In this example, the cooling passage 224 includes five columns 232; however, the cooling passage 224 may include any number of columns. Each of the columns 232 also includes a column outlet 232a, which is in fluid communication with a trailing edge outlet 234 defined at the trailing edge 218 via a conduit 236. With reference to FIG. 3, one or more of the columns 232 and the conduit 236 include the turbulators 158.

In this example, the forward turbine rotor 42 and the aft turbine rotor 44 each comprise a dual alloy turbine rotor, such that the first hub portion 70 and the second hub portion 200 are composed of a first metal or metal alloy, and the first plurality of blades 72a-j and the second plurality of blades 202a-j are each formed of a second metal or metal alloy, which is different from the first metal or metal alloy. In one example, the first metal or metal alloy is a nickel-based superalloy, having a relatively low cycle fatigue (LCF) resistance and moderate thermal tolerance and the second metal or metal alloy is an oxidation and stress rupture resistant, single crystal, nickel-based superalloy, such as the nickel-based superalloy commercially identified as "CMSX 4" or the nickel-based superalloy commercially identified as "SC180." It should be noted, however, that the first hub portion 70 and the second hub portion 200 need not be formed of the same material, but rather, the first hub portion 70 and the second hub portion 200 may each be formed of a distinct metal or metal alloy, which is distinct from the second metal or metal alloy. Moreover, as discussed previously herein, the first hub portion 70 and the blades 72a-j, and/or the second hub portion 200 and the blades 202a-j may be composed of the same materials (single metal or metal alloy).

Figure 8:
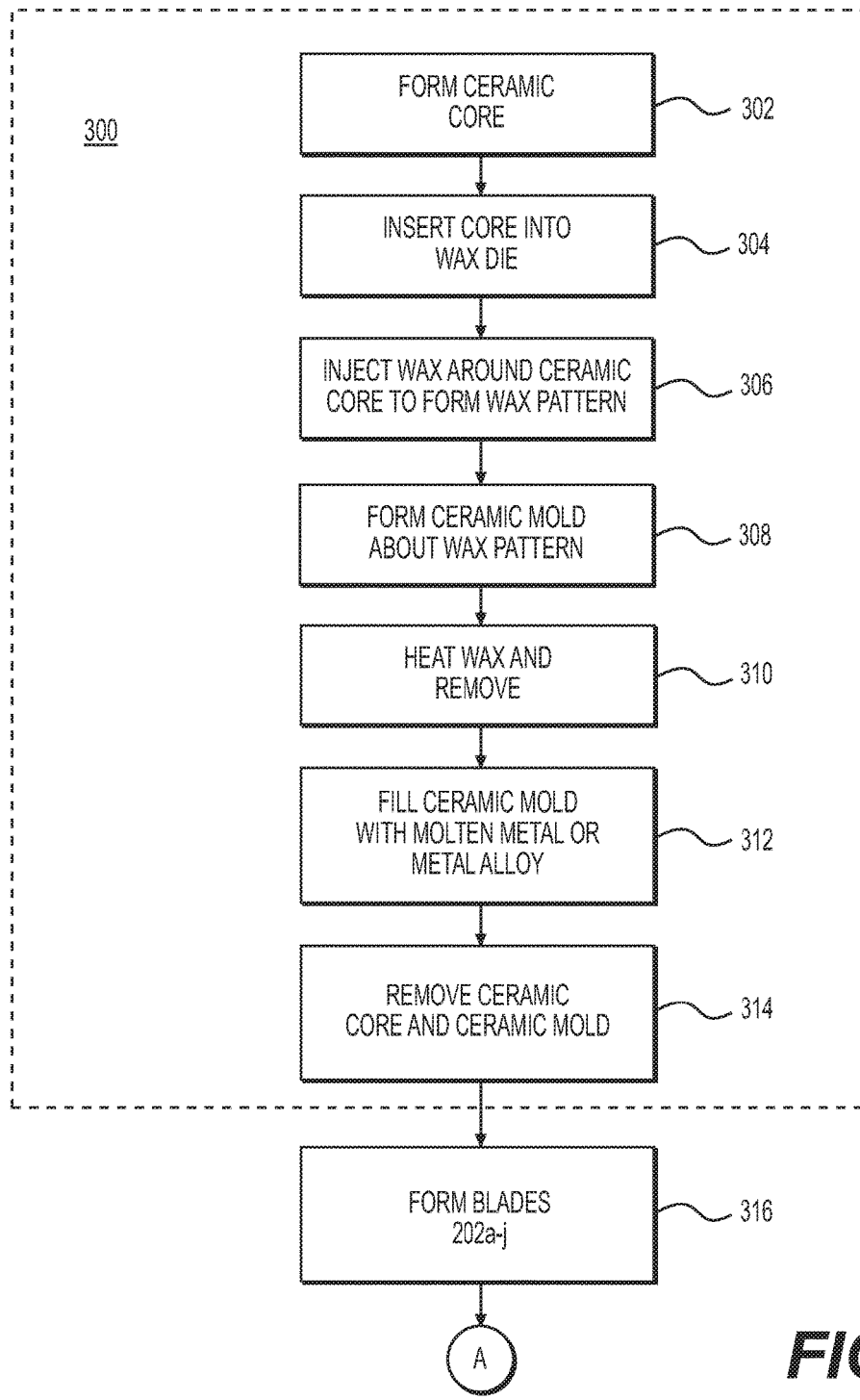
FIG. 8 is a flow chart illustrating a method of manufacturing the radial turbine of FIG. 1A.

In order to manufacture the forward turbine rotor 42, with reference to FIG. 8, the blades 72a-j may be formed at 300. In one example, each of the blades 72a-j are formed using investment casting. In this example, the core 110 (FIG. 6) is formed at 302 from a ceramic material, which may be cast or molded. Optionally, the core 110 may also be manufactured from a ceramic using ceramic additive manufacturing or selective laser sintering. With the core 110 formed, at 304, the core 110 may be positioned within a die. With the core 110 positioned within the die, the die is injected with liquid wax such that liquid wax surrounds the core 110 at 306. A wax sprue or conduit may also be coupled to the core 110 within the die to aid in the formation of the respective one of the blades 72a-j. Once the wax has hardened to form a wax pattern, the wax pattern is coated or dipped in ceramic at 308 to create a ceramic mold about the wax pattern. After coating the wax pattern with ceramic, the wax pattern may be subject to stuccoing and hardening. The coating, stuccoing and hardening processes may be repeated until the ceramic mold has reached the desired thickness.

With the ceramic mold at the desired thickness, the wax is heated to melt the wax out of the ceramic mold at 310. With the wax melted out of the ceramic mold, voids remain surrounding the core 110. At 312, the ceramic mold is filled with molten metal or metal alloy, such as the second metal or metal alloy. In one example, the molten metal is poured down an opening created by the wax sprue. Once the metal or metal alloy has solidified, at 314, the ceramic is removed from the metal or metal alloy, through chemical leaching, for example, leaving the diverging-converging cooling passage 100 formed in the metal or metal alloy, as illustrated in FIG. 6A.

It should be noted that alternatively to the method described in boxes 304-314, each of the blades 72a-j may be formed using conventional dies with one or more portions of the core 110 (or portions adjacent to the core 110) comprising a fugitive core insert.

With the blades 72a-j formed, the blades 202a-j may be formed at 316. In one example, the blades 202a-j are formed using the method of boxes 302-314, in which the core formed at 302 resembles a portion of the inverse structure shown in FIGS. 3 and 4.

Figure 9:
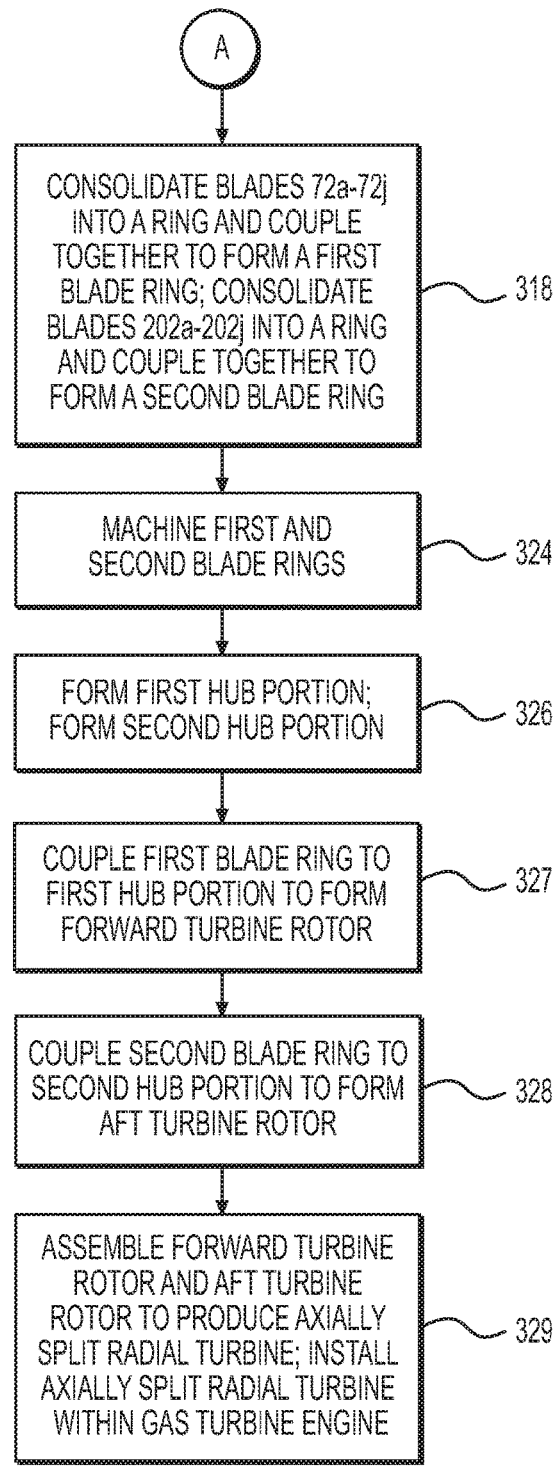
FIG. 9 is a continuation of the flow chart of FIG. 8.

With reference to FIG. 9, with the blades 72a-j and blades 202a-j formed, at 318, the blades 72a-j are consolidated into a ring, and coupled together to form a first blade ring (generally indicated as 320 in FIG. 2). In one example, a ring mold is used to consolidate the blades 72a-j into the first blade ring, and the blades 72a-j are metallurgically bonded together, via transient liquid phase (TLP) braze bonding, for example, to form a gas tight blade ring. It should be noted that any desired technique can be employed to form the first blade ring. Also at 318, the blades 202a-j are consolidated into a ring, and coupled together to form a second blade ring (generally indicated as 322 in FIG. 7). In one example, a ring mold is used to consolidate the blades 202a-j into the second blade ring, and the blades 202a-j are metallurgically bonded together, via hot isostatic pressing (HIP), for example, to form a gas tight blade ring. It should be noted that any desired technique can be employed to form the second blade ring.

At 324, the first blade ring and the second blade ring are machined as necessary to prepare for coupling with the first hub portion 70 and the second hub portion 200. At 326, the first hub portion 70 and the second hub portion 200 are formed. In one example, the first hub portion 70 and the second hub portion 200 can each be formed by unitary forging, casting, hot isostatic pressing (HIP), metal injection molding, additive manufacturing and so on. At 327, the first blade ring comprising the blades 72a-j is coupled to the first hub portion 70 to form the forward turbine rotor 42. In one example, the first blade ring, including each of the blades 72a-j, is metallurgically bonded to the first hub portion 70 along the coupling surface 90 via diffusion bonding, for example, via hot isostatic pressing (HIP). At 328, the second blade ring comprising the blades 202a-j is coupled to the second hub portion 200 to form the aft turbine rotor 44. In one example, the second blade ring, including each of the blades 202a-j, is metallurgically bonded to the second hub portion 200 along the coupling surface 216 via diffusion bonding.

At 329, the forward turbine rotor 42 is assembled to the aft turbine rotor 44 to produce the axially split radial turbine 12, and the axially split radial turbine 12 is installed within the gas turbine engine 10. In one example, the axially-split radial turbine 12 is assembled such that the blades 72a-j align axially with the blades 202a-j. In one example, the respective blades 72a-j abut the respective blades 202a-j. The circumferential alignment of the blades 72a-j of the forward turbine rotor 42 and the blades 202a-j of the aft turbine rotor 44 may also be maintained by an axial clamping force or pre-load exerted on the radial turbine 12 by the HP shaft 16. Additionally, a mating interface between the first hub portion 70 and the second hub portion 200 may be fabricated to include one or more alignment features (e.g., keys, teeth, or castellations). Further, or in addition, with reference to FIG. 1A, an annular wire seal 330 may be received in respective bore 332 to form a seal between the forward turbine rotor 42 and the aft turbine rotor 44. As a result of this structural configuration, neighboring pairs of blades 72a-j and blades 202a-j cooperate to form contiguous blade structures which provide continuous or uninterrupted transitions between blade segment surfaces (i.e., from the inducer to the exducer). When assembled, radial turbine 12 provides substantially uninterrupted airflow guidance surfaces along the blade passage and, specifically, when transitioning from the first hub portion 70 and the second hub portion 200, to minimize leakage of the compressed airflow between the first hub portion 70 and the second hub portion 200. In so doing, axially-split radial turbine 12 achieves aerodynamic performance levels substantially equivalent to that provided by a radial turbine having a unitary or monolithic construction. With the radial turbine 12 assembled, the radial turbine 12 is coupled to the HP shaft 16 and installed within the gas turbine engine 10.

Thus, with reference to FIGS. 1-6, the radial turbine 12 is provided, which includes the forward turbine rotor 42 having blades 72a with the diverging-converging cooling passage 100. The diverging-converging cooling passage 100 guides or directs the cooling air 52 from the cooling air plenum 48 via the single inlet 112a through the inlet flow passage 112. From a first point downstream from the single inlet 112a or at the outlet 112b of the inlet flow passage 112, the diverging-converging cooling passage 100 diverges into the first branch 114 and the second branch 116 to direct the cooling air 52 adjacent to the coupling surface 90 along the pressure side 96, the suction side 98 and the leading edge 92 before converging at a second point or common outlet 146 near the tip portion 102. From the tip portion 102, the diverging-converging cooling passage 100 diverges at a third point or the second common inlet 150 into the third branch 120 and the fourth branch 122 to guide or direct the cooling air 52 adjacent to the surface 108 along both the pressure side 96 and the suction side 98 before converging near the trailing edge 94 at a fourth point or the trailing edge section 124. Downstream from the fourth point, near the trailing edge section 124, the diverging-converging cooling passage 100 diverges at a fifth point into the fifth branch 126 and the sixth branch 128 prior to exiting the blades 72a-j at the plurality of outlets 130.

By guiding or directing the cooling air 52 adjacent to the coupling surface 90, adjacent to the exterior surface of the leading edge 92, and adjacent to the surface 108, the cooling of the blades 72a-j, which reduces the risk of oxidation thereof, is maintained with a reduced amount of cooling flow. In this regard, the diverging-converging cooling passage 100 enables about a 0.5% to about a 1.0% flow reduction in the amount of the cooling air 52 required to maintain sufficient cooling for a respective blade 72a-j. Thus, for the entire forward turbine rotor 42, the diverging-converging cooling passage 100 provides about a 10% to about a 20% flow reduction in the amount of cooling air 52 required to sufficiently cool the blades 72a-j. In one example, the diverging-converging cooling passage 100 maintains a temperature of the blades 72a-j below about 1400 degrees Fahrenheit at the coupling surface 90 and below about 1900 degrees Fahrenheit at the tip portion 102.

Figure 10:
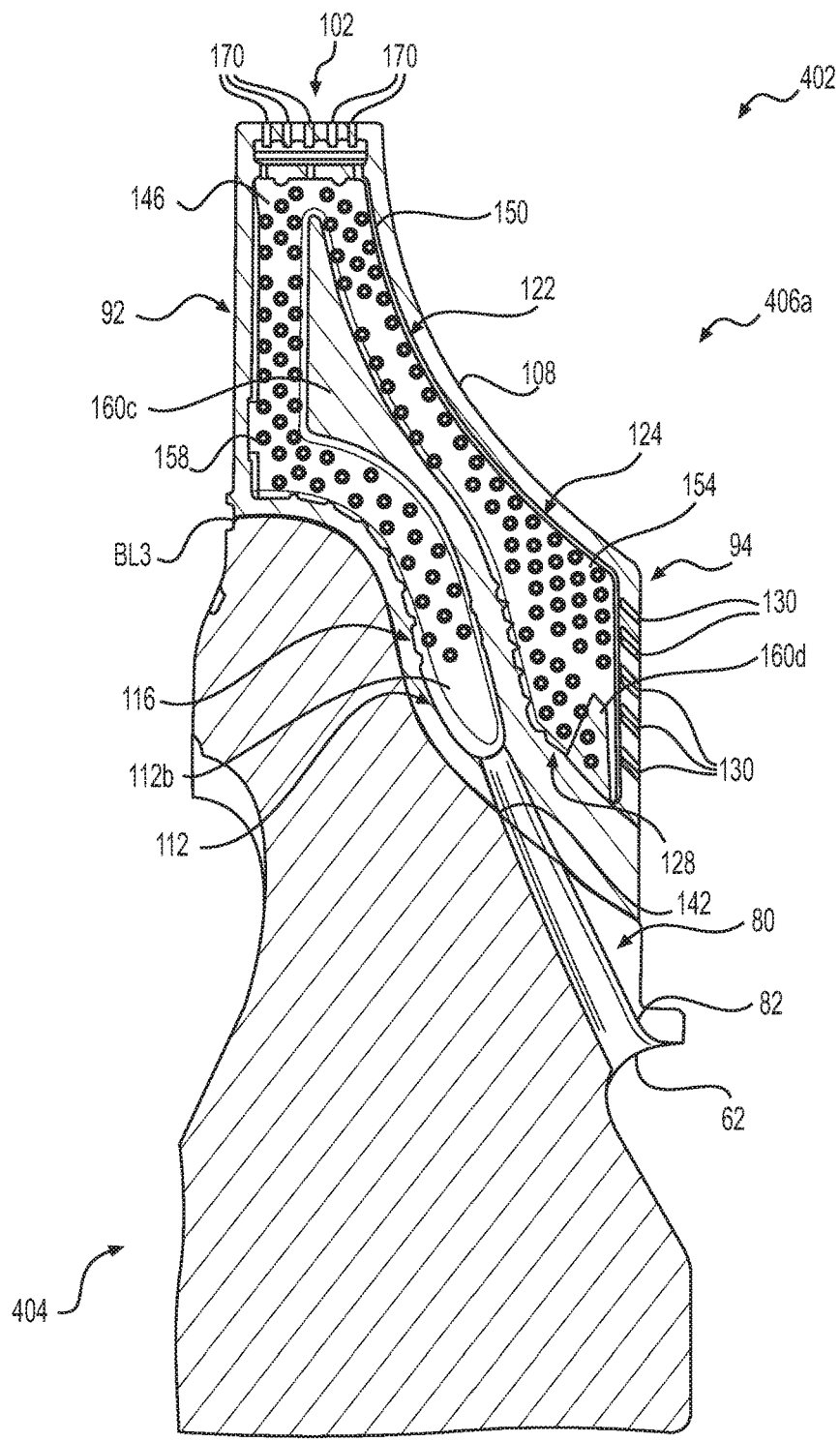
FIG. 10 is an exemplary cross-sectional view of a portion of another radial turbine having the exemplary diverging-converging cooling passage for a turbine blade.

It should be noted that the diverging-converging cooling passage 100 described with regard to FIGS. 1-9 is merely exemplary, and depending upon the shape and size of the radial turbine, the shape of the diverging-converging cooling passage 100 may vary. For example, with reference to FIG. 10, a cross-section of a forward turbine rotor 400 of an axially split radial turbine 402 is shown. As the forward turbine rotor 400 is substantially similar to the forward turbine rotor 42 discussed with regard to FIGS. 1-9, the forward turbine rotor 400 will not be discussed in great detail herein. The forward turbine rotor 400 includes a first hub 404 (substantially similar to the forward turbine rotor 42) and a plurality of blades 406a-j (with blade 406a shown). The forward turbine rotor 400 includes the diverging-converging cooling passage 100. In this example, each of the plurality of blades 406a-j is metallurgically bonded to the first hub 404 at a bond line BL3, which is positioned higher than the bond line BL of the forward turbine rotor 42 in FIGS. 1-9. Due to the higher location of the bond line BL3, a portion of the diverging-converging cooling passage 100 is formed within the first hub 404.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A turbine blade, comprising:
   a trailing edge;
   a leading edge opposite the trailing edge; and
   a cooling passage defined internally within the turbine blade, the cooling passage in fluid communication with a source of cooling fluid via a single inlet to receive a cooling fluid, and the cooling passage diverges at a first point downstream from the single inlet into a first branch and a second branch that extend along the at least one blade from the first point to direct the cooling fluid to a second common point near a tip of the leading edge and the first branch and the second branch converge at the second common point.

2. The turbine blade of claim 1, wherein the turbine blade has a pressure side opposite a suction side, the pressure side and the suction side extending from a coupling surface to an opposite second surface, the coupling surface to couple the turbine blade to a hub and a respective one of the first branch and the second branch extends along the pressure side adjacent to the first surface and the other of the first branch and the second branch extends along the suction side adjacent to the first surface.

3. The turbine blade of claim 2, further comprising a cross flow path that fluidly interconnects the first branch and the second branch near the coupling surface at the leading edge to direct cooling fluid near the coupling surface at the leading edge.

4. The turbine blade of claim 1, wherein the cooling passage includes a tip flow passage defined at the tip of the leading edge that is fluidly coupled to the cooling passage near the second common point.

5. The turbine blade of claim 2, wherein the cooling passage diverges at a third point, which is downstream from the second common point, into at least two secondary branches.

6. The turbine blade of claim 5, wherein a respective one of the at least two secondary branches extends along the pressure side adjacent to the second surface and the other of the at least two secondary branches extends along the suction side adjacent to the second surface.

7. The turbine blade of claim 5, wherein the cooling passage converges at a fourth point, which is downstream from the third point, and diverges at a fifth point into at least two tertiary branches, and the fifth point is downstream from the fourth point.

8. The turbine blade of claim 7, wherein the at least two tertiary branches terminate in a plurality of outlets at the trailing edge.

9. The turbine blade of claim 1, wherein the turbine blade is a radial turbine blade.

10. A radial turbine, comprising:
    a hub; and
    at least one blade coupled to the hub, the at least one blade having a coupling surface that couples the at least one blade to the hub and a leading edge having a tip, the at least one blade defining an internal cooling passage, the internal cooling passage in fluid communication with a source of cooling fluid via a single inlet to receive a cooling fluid, and the internal cooling passage diverges downstream from the single inlet into a first branch and a second branch that extend along opposite sides of the coupling surface to direct the cooling fluid to a common point near the tip of the leading edge and the internal cooling passage converges at the common point near the tip.

11. The radial turbine of claim 10, wherein the at least one blade further comprises a cross flow passage that fluidly interconnects the first branch and the second branch near the coupling surface at the leading edge to direct cooling fluid near the coupling surface at the leading edge.

12. The radial turbine of claim 10, wherein the internal cooling passage includes a tip flow path defined at the tip of the leading edge that is fluidly coupled to the internal cooling passage to direct cooling fluid adjacent to the tip.

13. The radial turbine of claim 10, wherein the at least one blade has a pressure side opposite a suction side that each extend along the coupling surface, and a respective one of the first branch and the second branch extends along the pressure side adjacent to the coupling surface to direct cooling fluid along the pressure side near the coupling surface and the other of the first branch and the second branch extends along the suction side adjacent to the coupling surface to direct cooling fluid along the suction side near the coupling surface.

14. The radial turbine of claim 13, wherein the internal cooling passage diverges downstream from the convergence at the common point into at least two secondary branches.

15. The radial turbine of claim 14, wherein the at least one blade includes a surface opposite the coupling surface, and a respective one of the at least two secondary branches extends adjacent to the pressure side near the surface and the other of the at least two secondary branches extends adjacent to the suction side near the surface.

16. The radial turbine of claim 15, wherein the internal cooling passage converges downstream from the at least two secondary branches, and diverges further downstream into at least two tertiary branches.

17. The radial turbine of claim 16, wherein the at least one blade includes a trailing edge opposite the leading edge, and the at least two tertiary branches terminate in a plurality of outlets at the trailing edge.

18. The radial turbine of claim 10, wherein the radial turbine comprises an axially split radial turbine, the hub comprises a first hub portion coupled to a second hub portion, and the at least one blade comprises at least one blade segment of the first hub portion.

19. The radial turbine of claim 18, wherein the first hub portion defines an inlet cooling fluid passage in fluid communication with the source of cooling fluid, and the single inlet is in fluid communication with the inlet cooling fluid passage of the first hub portion to receive the cooling fluid.

20. The radial turbine of claim 16, wherein at least one of the first branch and the second branch, the at least two secondary branches and the at least two tertiary branches includes at least one heat transfer augmentation feature to increase the cooling effectiveness of the cooling fluid.

\* \* \* \* \*